US006980873B2

(12) United States Patent
Shen

(10) Patent No.: US 6,980,873 B2
(45) Date of Patent: Dec. 27, 2005

(54) SYSTEM AND METHOD FOR REAL-TIME FAULT DETECTION, CLASSIFICATION, AND CORRECTION IN A SEMICONDUCTOR MANUFACTURING ENVIRONMENT

(75) Inventor: Hsueh Chi Shen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 36 days.

(21) Appl. No.: 10/831,064

(22) Filed: Apr. 23, 2004

(65) Prior Publication Data

US 2005/0251276 A1 Nov. 10, 2005

(51) Int. Cl.[7] .............................................. G06F 19/00
(52) U.S. Cl. ...................... 700/108; 700/121; 700/223
(58) Field of Search ................ 700/114–117, 108–110, 700/121, 213, 223, 228, 175, 100, 96

(56) References Cited

U.S. PATENT DOCUMENTS

| | | | |
|---|---|---|---|
| 5,231,585 A * | 7/1993 | Kobayashi et al. | ........... 700/96 |
| 5,610,903 A | 3/1997 | Crayford | |
| 5,859,964 A | 1/1999 | Wang et al. | |
| 6,018,808 A | 1/2000 | Schieve | |
| 6,133,132 A | 10/2000 | Toprac et al. | |
| 6,245,581 B1 | 6/2001 | Bonser et al. | |
| 6,263,255 B1 | 7/2001 | Tan et al. | |
| 6,294,472 B1 | 9/2001 | Smith et al. | |
| 6,304,999 B1 | 10/2001 | Toprac et al. | |
| 6,335,286 B1 | 1/2002 | Lansford | |
| 6,337,217 B1 | 1/2002 | Hause et al. | |
| 6,346,426 B1 | 2/2002 | Toprac et al. | |
| 6,351,684 B1 * | 2/2002 | Shirley et al. | .............. 700/121 |
| 6,352,870 B1 | 3/2002 | Lansford | |
| 6,360,133 B1 | 3/2002 | Campbell et al. | |
| 6,362,116 B1 | 3/2002 | Lansford | |
| 6,365,422 B1 | 4/2002 | Hewett et al. | |
| 6,368,184 B1 | 4/2002 | Beckage | |
| 6,368,883 B1 | 4/2002 | Bode et al. | |
| 6,368,884 B1 | 4/2002 | Goodwin et al. | |
| 6,376,261 B1 | 4/2002 | Campbell | |
| 6,383,824 B1 | 5/2002 | Lensing | |
| 6,383,888 B1 | 5/2002 | Stirton | |
| 6,387,823 B1 | 5/2002 | Sonderman et al. | |
| 6,405,096 B1 | 6/2002 | Toprac et al. | |
| 6,405,144 B1 | 6/2002 | Toprac et al. | |
| 6,409,879 B1 | 6/2002 | Toprac et al. | |
| 6,410,351 B1 | 6/2002 | Bode et al. | |

(Continued)

OTHER PUBLICATIONS

Coss Jr., "Architecture for Automated Large Scale Fault Detection and Classification: A Breakthrough Design", Nov. 14, 2002; 12 pgs., Advanced Micro Devices, Inc.

(Continued)

Primary Examiner—Kidest Bahta
(74) Attorney, Agent, or Firm—Haynes and Boone, LLP

(57) ABSTRACT

A system and method for detecting a fault and identifying a remedy for the fault in real-time in a semiconductor product manufacturing facility are provided. In one example, the method includes importing data from a manufacturing device and data representing a plurality of different manufacturing devices into an analysis tool. The imported data is analyzed using the analysis tool to determine if a fault exists in the manufacturing device's operation and, if a fault exists, the fault is classified and a remedy for the fault is identified based at least partly on the classification. Configuration data used to control the manufacturing device may be updated, and the update may apply the remedy to the configuration information. The manufacturing device's operation may then be modified using the updated configuration data.

20 Claims, 7 Drawing Sheets

U.S. PATENT DOCUMENTS

| | | |
|---|---|---|
| 6,427,093 B1 | 7/2002 | Toprac |
| 6,442,496 B1 | 8/2002 | Pasadyn et al. |
| 6,444,481 B1 | 9/2002 | Pasadyn et al. |
| 6,448,099 B1 | 9/2002 | Iacoponi et al. |
| 6,449,524 B1 | 9/2002 | Miller et al. |
| 6,451,700 B1 | 9/2002 | Stirton et al. |
| 6,458,605 B1 | 10/2002 | Stirton |
| 6,458,610 B1 | 10/2002 | Lensing et al. |
| 6,460,002 B1 | 10/2002 | Bone et al. |
| 6,461,878 B1 | 10/2002 | Lansford |
| 6,465,263 B1 | 10/2002 | Coss, Jr. et al. |
| 6,470,230 B1 | 10/2002 | Toprac et al. |
| 6,479,200 B1 | 11/2002 | Stirton |
| 6,479,309 B1 | 11/2002 | Wright |
| 6,480,854 B1 | 11/2002 | Gross et al. |
| 6,484,064 B1 | 11/2002 | Campbell |
| 6,485,990 B1 | 11/2002 | Lansford |
| 6,486,036 B1 | 11/2002 | Miethke et al. |
| 6,509,201 B1 | 1/2003 | Wright |
| 6,511,898 B1 | 1/2003 | Sonderman et al. |
| 6,512,991 B1 | 1/2003 | Davis et al. |
| 6,524,163 B1 | 2/2003 | Stirton |
| 6,524,774 B1 | 2/2003 | Sonderman |
| 6,528,331 B1 | 3/2003 | Bode et al. |
| 6,529,282 B1 | 3/2003 | Stirton et al. |
| 6,529,789 B1 | 3/2003 | Campbell et al. |
| 6,532,428 B1 | 3/2003 | Toprac |
| 6,532,555 B1 | 3/2003 | Miller et al. |
| 6,534,328 B1 | 3/2003 | Hewett et al. |
| 6,535,774 B1 | 3/2003 | Bode et al. |
| 6,535,783 B1 | 3/2003 | Miller et al. |
| 6,546,508 B1 | 4/2003 | Sonderman et al. |
| 6,549,822 B1 | 4/2003 | Toprac |
| 6,556,881 B1 | 4/2003 | Miller |
| 6,556,882 B1 | 4/2003 | Conboy et al. |
| 6,556,884 B1 | 4/2003 | Miller et al. |
| 6,556,959 B1 | 4/2003 | Miller et al. |
| 6,560,503 B1 | 5/2003 | Toprac et al. |
| 6,560,506 B2 | 5/2003 | Toprac |
| 6,562,635 B1 | 5/2003 | Lensing et al. |
| 6,563,300 B1 | 5/2003 | Jackson et al. |
| 6,567,718 B1 | 5/2003 | Campbell et al. |
| 6,569,692 B1 | 5/2003 | Bode et al. |
| 6,570,228 B1 | 5/2003 | Fuselier et al. |
| 6,571,371 B1 | 5/2003 | Coss, Jr. et al. |
| 6,576,385 B2 | 6/2003 | Bode et al. |
| 6,577,914 B1 | 6/2003 | Bode |
| 6,582,618 B1 | 6/2003 | Toprac et al. |
| 6,582,863 B1 | 6/2003 | Stirton et al. |
| 6,582,975 B1 | 6/2003 | Ryskoski |
| 6,588,007 B1 | 7/2003 | Pasadyn et al. |
| 6,589,875 B1 | 7/2003 | Bode et al. |
| 6,593,227 B1 | 7/2003 | Ryskoski |
| 6,594,589 B1 | 7/2003 | Coss, Jr. et al. |
| 6,595,830 B1 | 7/2003 | Hewett et al. |
| 6,597,447 B1 | 7/2003 | Stirton et al. |
| 6,599,174 B1 | 7/2003 | Spikes, Jr. |
| 6,605,479 B1 | 8/2003 | Pasadyn et al. |
| 6,607,926 B1 | 8/2003 | Toprac et al. |
| 6,610,181 B1 | 8/2003 | Besser et al. |
| 6,614,540 B1 | 9/2003 | Stirton |
| 6,615,098 B1 | 9/2003 | Bode et al. |
| 6,617,258 B1 | 9/2003 | Sonderman et al. |
| 6,618,149 B1 | 9/2003 | Stirton |
| 6,618,640 B1 | 9/2003 | Hittner et al. |
| 6,622,059 B1 | 9/2003 | Toprac et al. |
| 6,622,061 B1 | 9/2003 | Toprac et al. |
| 6,625,512 B1 | 9/2003 | Goodwin |
| 6,625,514 B1 | 9/2003 | Lensing |
| 6,629,012 B1 | 9/2003 | Riley et al. |
| 6,629,879 B1 | 10/2003 | Kim et al. |
| 6,630,360 B2 | 10/2003 | Christian et al. |
| 6,630,362 B1 | 10/2003 | Lensing |
| 6,632,692 B1 | 10/2003 | Hewett et al. |
| 6,640,148 B1 | 10/2003 | Miller et al. |
| 6,643,008 B1 | 11/2003 | Stirton et al. |
| 6,643,557 B1 | 11/2003 | Miller et al. |
| 6,645,780 B1 | 11/2003 | Sonderman et al. |
| 6,647,309 B1 | 11/2003 | Bone |
| 6,650,435 B1 | 11/2003 | Ikeda |
| 6,650,957 B1 | 11/2003 | Campbell et al. |
| 6,657,716 B1 | 12/2003 | Lensing et al. |
| 6,660,539 B1 | 12/2003 | Sonderman et al. |
| 6,660,542 B1 | 12/2003 | Stirton |
| 6,660,543 B1 | 12/2003 | Stirton et al. |
| 6,660,651 B1 | 12/2003 | Markle |
| 6,664,013 B1 | 12/2003 | Hewett et al. |
| 6,665,623 B1 | 12/2003 | Pasadyn et al. |
| 6,666,754 B1 | 12/2003 | Beckage |
| 6,675,058 B1 | 1/2004 | Pasadyn et al. |
| 6,677,170 B1 | 1/2004 | Markle |
| 6,678,570 B1 | 1/2004 | Pasadyn et al. |
| 6,684,122 B1 | 1/2004 | Christian et al. |
| 6,687,561 B1 | 2/2004 | Pasadyn et al. |
| 6,689,521 B1 | 2/2004 | Goodwin |
| 6,697,153 B1 | 2/2004 | Wright et al. |
| 6,697,691 B1 | 2/2004 | Miller et al. |
| 6,697,696 B1 | 2/2004 | Hickey et al. |
| 6,698,009 B1 | 2/2004 | Pasadyn et al. |
| 6,699,727 B1 | 3/2004 | Toprac et al. |
| 6,701,206 B1 | 3/2004 | Markle et al. |
| 6,706,631 B1 | 3/2004 | Fulford |
| 6,707,562 B1 | 3/2004 | Lensing |
| 6,708,129 B1 | 3/2004 | Pasadyn et al. |
| 6,709,797 B1 | 3/2004 | Bushman et al. |
| 6,716,646 B1 | 4/2004 | Wright et al. |
| 6,721,616 B1 | 4/2004 | Ryskoski |
| 6,725,121 B1 | 4/2004 | Pasadyn et al. |
| 6,725,402 B1 | 4/2004 | Coss, Jr. et al. |
| 6,763,130 B1 * | 7/2004 | Somekh et al. ............ 700/110 |
| 6,834,213 B1 * | 12/2004 | Sonderman et al. ........ 700/121 |
| 2002/0099464 A1 * | 7/2002 | O'Connor et al. .......... 700/117 |

OTHER PUBLICATIONS

Goodlin, Brian E., et al., "Simultaneous Fault Detection and Classification for Semiconductor Manufacturing Tools", 201$^{st}$ Meeting of the Electrochemical Society, International Symposium on Plasma Processing XIV, May 2002, 16 pages.

* cited by examiner

SYSTEM AND METHOD FOR REAL-TIME FAULT DETECTION, CLASSIFICATION, AND CORRECTION IN A SEMICONDUCTOR MANUFACTURING ENVIRONMENT

CROSS-REFERENCE

This application is related to U.S. patent application Ser. No. 10/831,064, filed on Apr. 23, 2005, and entitled "A SYSTEM AND METHOD FOR IMPROVING EQUIPMENT COMMUNICATION IN A SEMICONDUCTOR MANUFACTURING ENVIRONMENT."

TECHNICAL FIELD

The present disclosure relates generally to semiconductor manufacturing and, more specifically, to a computer-based system for fault detection and classification in a semiconductor 3manufacturing facility.

BACKGROUND

In a semiconductor manufacturing business, manufacturing equipment may be used to perform operations such as processing semiconductor wafers, monitoring such processing, transferring wafers between pieces of equipment, and performing similar functions. Due to the complex nature of semiconductor processing, multiple variables may be monitored at any given time. For example, processing equipment may perform processing in a chamber that is controlled by such parameters as pressure, temperature, and duration of processing time. Tracking these parameters may result in a relatively large amount of data that makes identifying faults in the processing equipment's operation difficult and may lengthen the amount of time needed to respond to such a fault.

Accordingly, what is needed in the art is an improved system and method for identifying and addressing faults in a semiconductor manufacturing environment.

DETAILED DESCRIPTION

Figure 1:
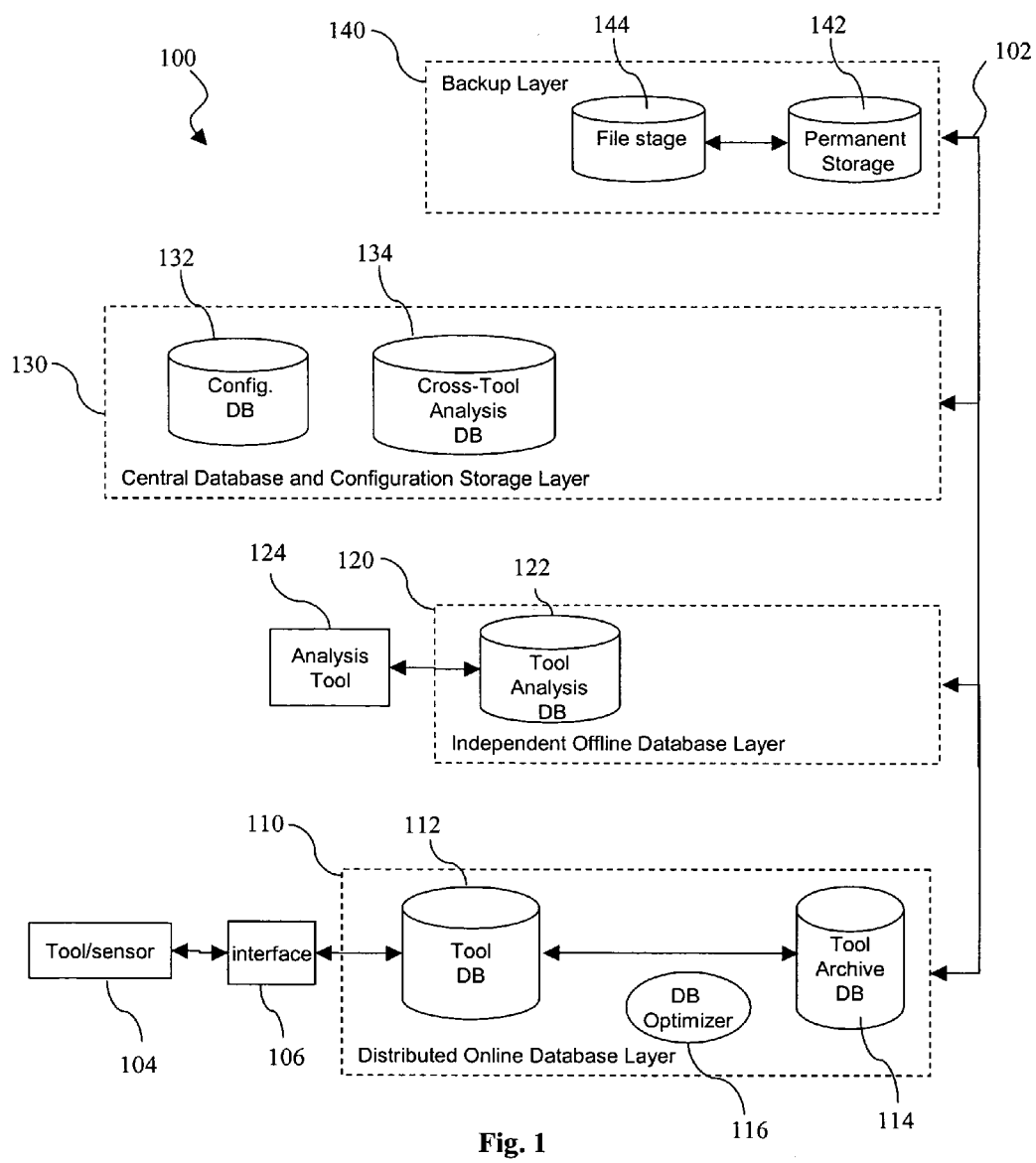
FIG. 1 illustrates a schematic view of one embodiment of a fault detection and classification system according to aspects of the present disclosure.

The present disclosure relates generally to semiconductor manufacturing and, more specifically, to a computer-based system for fault detection and classification in a semiconductor manufacturing facility. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a fault detection and classification system 100 is illustrated. The system 100 supports automatic fault detection and classification, and may be used to automatically implement a remedy to correct the fault. As will be described later in greater detail, the system 100 may be implemented in a semiconductor manufacturing environment to handle relatively large amounts of both real-time and delayed data. The system 100 includes a hierarchy of layers 110, 120, 130, and 140. It is understood that the layers are illustrated for purposes of example only, and that they may be combined and/or further divided to form many different configurations. Furthermore, additional layers may be added to the system 100. The layers 110, 120, 130, and 140 may be connected via one or more networks 102 for purposes of communication.

The layer 110 may include one or more tool databases 112, archive tool databases 114, and a database optimization process 116. The layer 110 may be connected to one or more manufacturing devices 104 (e.g., process tools, sensors, etc.) via an interface 106, which is a fault detection and classification (FDC) interface in the present example. In the present example, the manufacturing device 104 is a process tool, but it is understood that it may be any device or process used in a semiconductor manufacturing environment. Although the process tool 104 and FDC interface 106 are not shown as part of the layer 110, it is understood that they may be included in the layer in some embodiments. In the present example, each process tool 104 may be associated with its own tool database 112 from the layer 110. However, other configurations may provide a single tool database 112 for multiple process tools 104. If the tool database 112 is shared by multiple process tools 104, data from each process tool may be stored separately from data from the other process tools, or the data may be combined. The tool database 112 may be connected to a tool archive database 114, which may be used to store at least a portion of the data from the tool database 112. As will be described later in greater detail, the database optimization process 116 may be used to filter data, archive data from the tool database 112 to the archive tool database 114, and perform other tasks.

The process tool 104 may comprise an individual process reactor and/or a cluster tool that is able to execute multiple processing steps for the creation a microelectronics product. Exemplary steps may include deposition of a refractory metal such as TiN, TaN, or WN followed by the deposition of a Cu seed, and a bulk Cu deposition over a substrate. The process tool 104 may execute processes such as chemical vapor deposition (CVD), plasma assisted chemical vapor deposition (PECVD), atomic layer deposition (ALD), physical vapor deposition (PVD), photolithography, plasma etch, or chemical etching. The process tool 104 may also include metrology tools for the classification of defects and features of the product. Such metrology tools may include scanning electron microscopes (SEM), laser surface defect scanners, optical microscopes, residual gas analyzers, process tool particle counters, and/or a variety of other metrology tools. The process tool 104 may further include a plurality of sensors for monitoring pressure, gas flows, time, temperature, impurity levels, and/or other parameters.

The FDC interface 106 may include a hardware and/or software based interface for the process tool 104. The FDC interface 106 may provide an interface between the process tool 104 and a manufacturing executing system (MES) (not shown). The FDC interface 106 may be adapted for communication with other entities through wired or wireless connections and protocols. Wired connections may include LAN, Ethernet, and/or other direct wire connections, while wireless connections may include BlueTooth®, 802.11b, 802.1 µg, and/or other wireless communication protocols. The FDC interface 106 may also be recognized by other devices (not shown) on the network 102 as a network entity. The FDC interface 106 may connect to the process tool 104 through a semiconductor equipment communications standard (SECS) and/or generic equipment model (GEM) communication link, or by other connections as may be known by one skilled in the art.

In some embodiments, a switching device or process may be used to aid in establishing simultaneous connections between multiple tools/processes and the process tool 104. Such switching is described in greater detail in U.S. patent application Ser. No. 10/851,592, filed on May 20, 2004, and entitled "A SYSTEM AND METHOD FOR IMPROVING EQUIPMENT COMMUNICATION IN A SEMICONDUCTOR MANUFACTURING ENVIRONMENT," which is hereby incorporated by reference as if reproduced in its entirety.

The tool database 112 may include a plurality of storage devices, as well as instructions for manipulating data received through the FDC interface 106. The database optimization process 116 may include instructions for filtering, concatenating, and purging fragmented information from the tool database 112. The database optimization process 116 may also include instructions for maintaining predefined file sizes or a predefined database structure. For example, the tool database 112 may utilize an online translation protocol (OLTP) that aids in maintain relatively small file sizes. Accordingly, the database optimization process 116 may maintain the file structure within the tool database 112 as defined by the OLTP. The database optimization process may provide other functionality, such as indexing data, providing status, dates, location, and/or other related events from the tool database 112.

The tool archive database 114 may include a plurality of storage devices to provide local and temporary storage of the information. The information may include raw data obtained directly from the FDC interface 106 and/or may include information from the tool database 112. For example, the database optimization process may extract information from the tool database 112 and store it in the archive tool database 114 for archival purposes.

The layer 120 includes one or more analysis databases 122 connected to one or more analysis tools 124. Instructions (not shown) for extracting, translating, and loading (collectively referred to hereinafter as an ETL process) may also be included in the layer 120. The analysis database 122 may receive information from the tool database 112 and/or the tool archive database 114 of the layer 110. In addition, the analysis database 122 may store pre-analysis and/or post-analysis information received from the analysis tool 124.

The ETL process may be used to extract specific data from the analyzed information after processing by the analysis tools 124-N. The ETL process may be used to translate the analyzed information, which may include the application of rules for structuring information into reports or other documents. For example, the ETL process may create a plurality of reports summarizing the analyzed information, and the reports may be periodically and/or continuously updated. The reports generated by the ETL process may include information detailing or summarizing the process tool 104 and its operation. The ETL process may also load information into a statistical process control (SPC) module in the analysis tool 124 and/or other computing entities within other layers 110, 130, and 140.

The analysis tool 124 may include a plurality of analysis instructions for statistically summarizing the information from the layers 110, 130, and 140. The analysis tool 124 may further provide comparison analysis between historical information and information collected in real-time through the FDC interface 106 of the layer 110.

The layer 130 may include at least one configuration database 132 and at least one cross-tool analysis database 134.

The configuration database 132 may store configuration information, process control models, and process control strategies for the process tool 104. In addition, the configuration database 132 may provide information used to modify the various data that affect the process tool 104. For example, the information may be used to adjust a process parameter such as gas flow, chamber pressure, and/or process time. In this manner, optimizations and other adjustments may be made to the process tool 104 via the network 102.

The configuration database 132 may receive information from the cross-tool analysis database 134, the layer 140, the layer 120, and the layer 110. The configuration database 132 may further provide correlation analysis between the information supplied by the analysis tool 124, the cross-tool analysis database 134, and other storage devices. The correlation may provide determination of influential process parameters which impact product yield and device performance. The correlation may be utilized to control correlated parameters of the process tool 112.

The cross-tool analysis database 134 may include information obtained from multiple process tools 104. Such information may be used to analyze the performance, yield rate, and other data of each process tool with that of the other process tools. For example, there may be eight process tools dedicated to the same process within the semiconductor product manufacturing facility, and the cross-tool analysis database 134 may store similar information from each tool that may be analyzed to identify various trends or other performance issues. In some embodiments, the analysis may include benchmarking and normalization of the eight process tools 104. The cross-tool analysis database 134 may provide instructions for implementing SPC upon the information comprising the cross-tool analytics database.

The layer 140 may include permanent storage (e.g., backup databases, compact disks, tapes, etc.) 142. Information may be stored to the permanent storage 142 from one or more of the other layers 110, 120, 130 periodically (e.g., upon the occurrence of an event) or at scheduled intervals.

Figure 2:
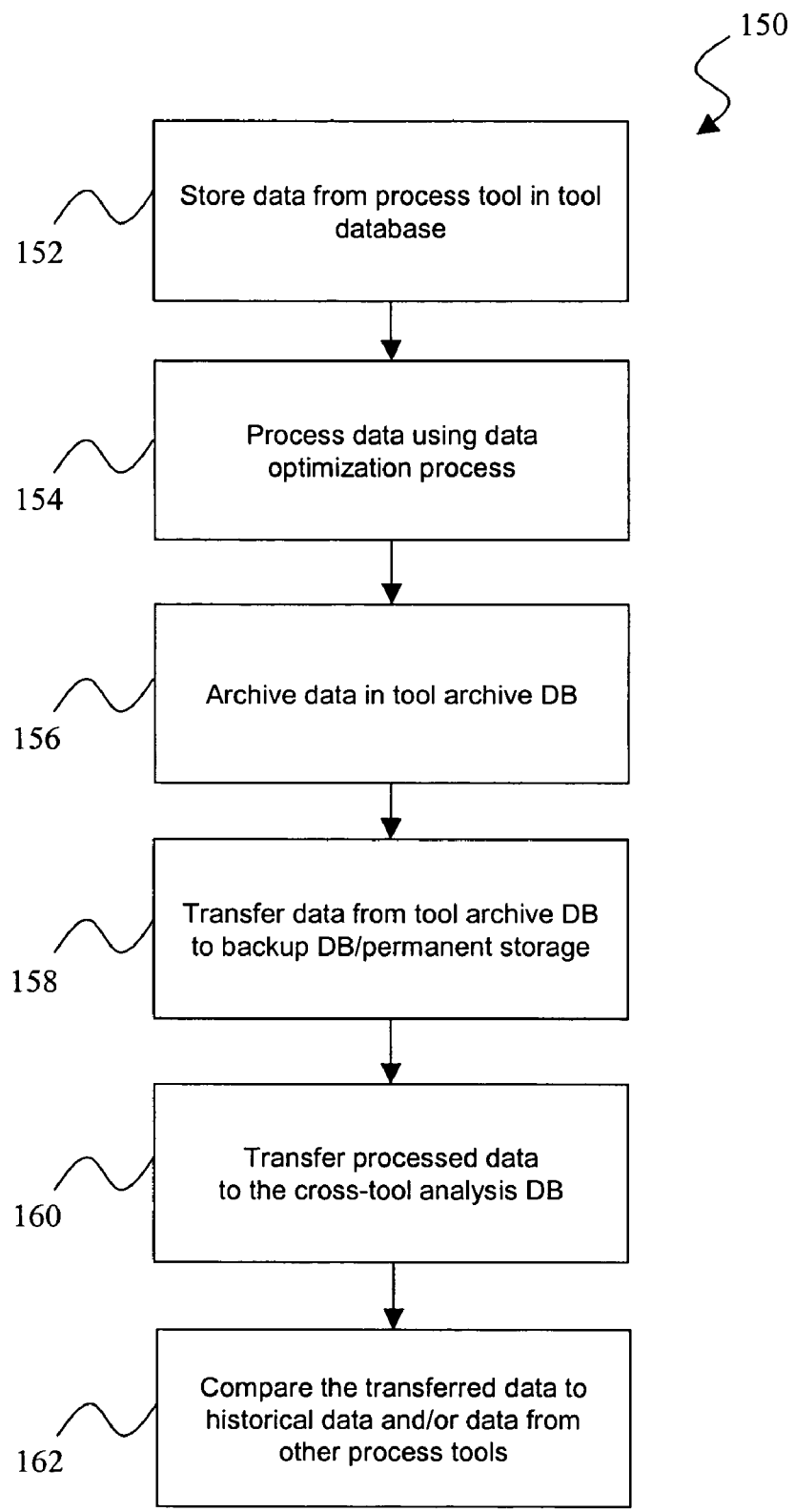
FIG. 2 is a flowchart of an exemplary method for retrieving and analyzing data that may be executed within the system of FIG. 1.
Figure 3:
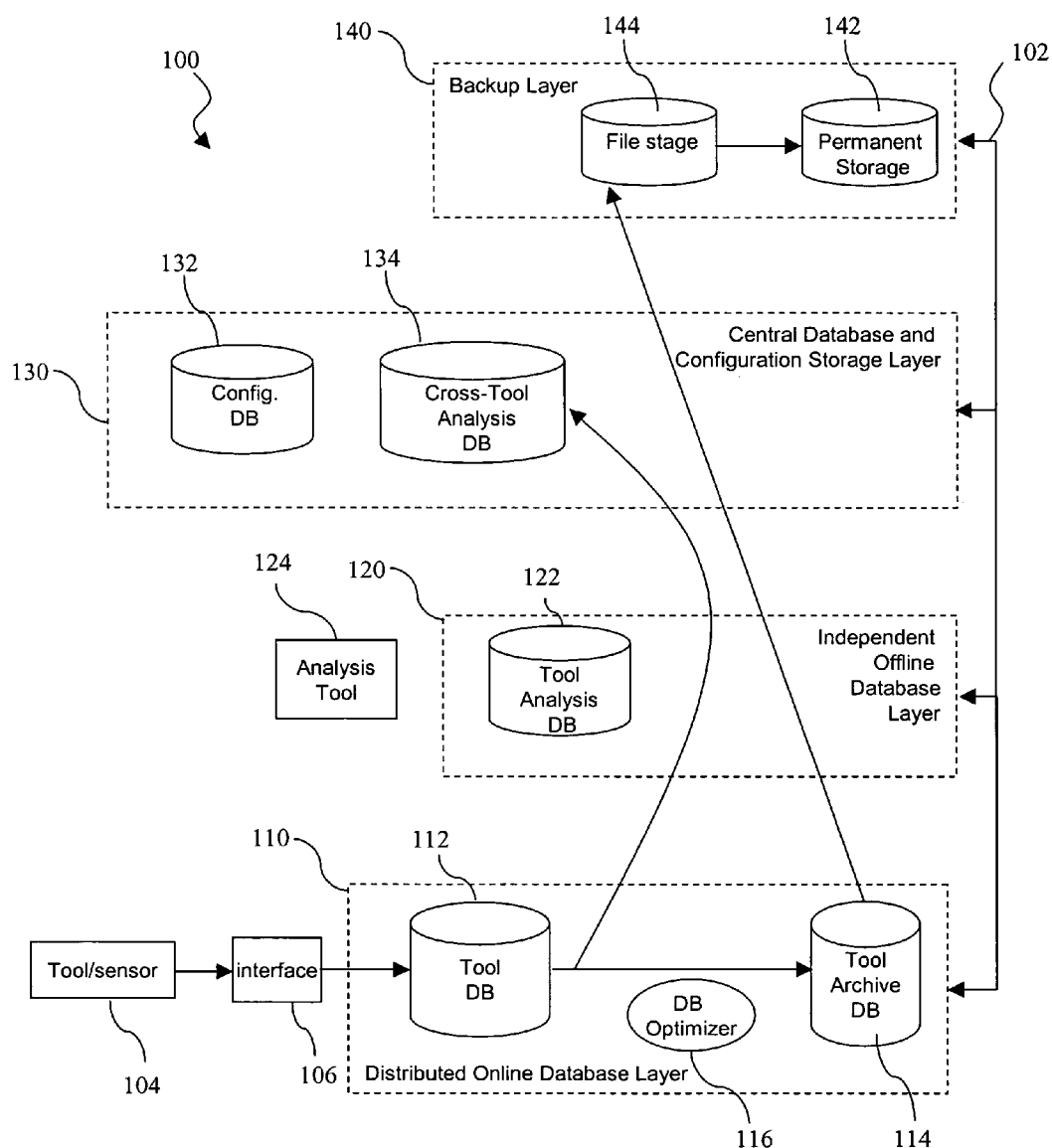
FIG. 3 illustrates an exemplary data flow corresponding to the method of FIG. 2.

Referring now to FIG. 2 and with additional reference to FIG. 3, an exemplary method 150 illustrates one possible flow of data through the system 100 of FIG. 1. In the present example, the data flow enables data from the process tool 104 to be retrieved, archived, and analyzed against other data.

In step 152, data obtained from the process tool 104 and/or the FDC interface 106 may be stored in the tool database 112. It is understood that other data, such as data from a manufacturing execution system (not shown) may be included in the stored data.

In step 154, the data in the tool database 112 may be processed by the database optimization process 116. The processing may include identifying and discarding fragmented and/or redundant data, purging data that is not usable (e.g., corrupt) or accessible, compressing the data using one or more compression techniques to reduce the amount of data that must be stored, formatting the data to comply with a predefined format, etc.

In step 156, the data may be archived in the tool archive database 114. The data may be archived in its original form (e.g., as obtained from the process tool 104 and/or FDC interface 106) and/or may be archived in its processed form (after completion of step 154).

In step 158, the archived data may be moved to the file stage 144 and stored on permanent storage 142. In some embodiments, the data may be stored to the layer 140 without first storing the data on the tool archive database 114. In the present example, the data may be transferred from the tool archive database 114 using a backup agent (not shown), which may transfer the data at predefined intervals or upon the occurrence of a predefined event.

In step 160, processed data may be transferred from the tool database 112 to the cross-tool analysis database 134. The ETL process may be used to translate the processed data, which may include the application of rules for structuring the data into reports or other documents. For example, the ETL process may create a plurality of reports summarizing the processed data, and the reports may be periodically and/or continuously updated. The reports generated by the ETL process may include information detailing or summarizing the process tool 104 and its operation.

In step 162, the data may be compared to other data (e.g., historical data and/or data from other process tools) in the cross-tool analysis database 134. The comparison and/or other analysis methods may be used to identify trends, evaluate the performance of the process tool 104, provide optimization information, and perform other analytical operations.

It is understood that the steps of the method 150 may be performed in a different order or simultaneously. For example, step 160 may occur before step 156, or the steps may occur simultaneously.

Figure 4:
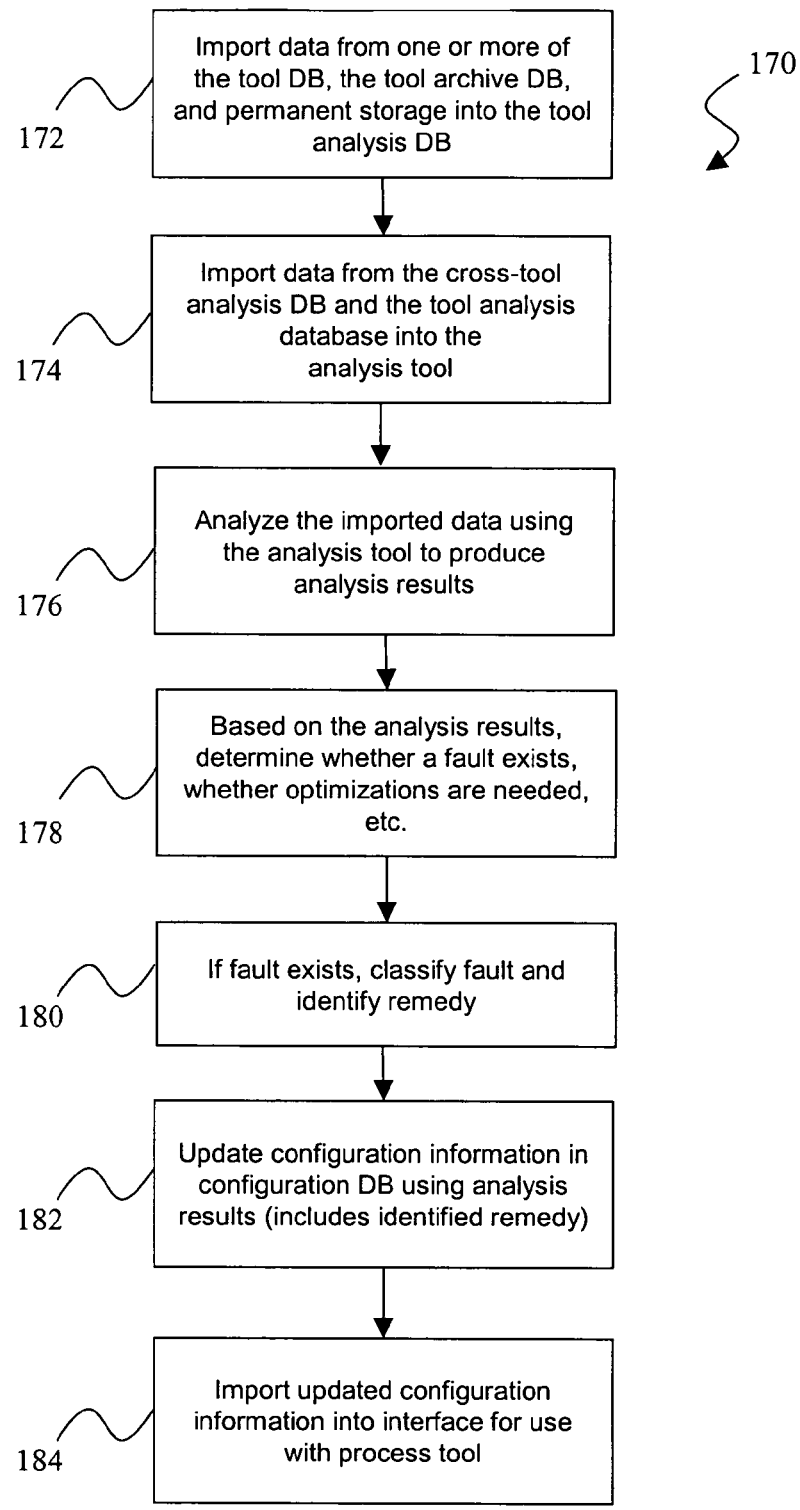
FIG. 4 is a flowchart of an exemplary method for fault identification and classification that may be executed within the system of FIG. 1.
Figure 5:
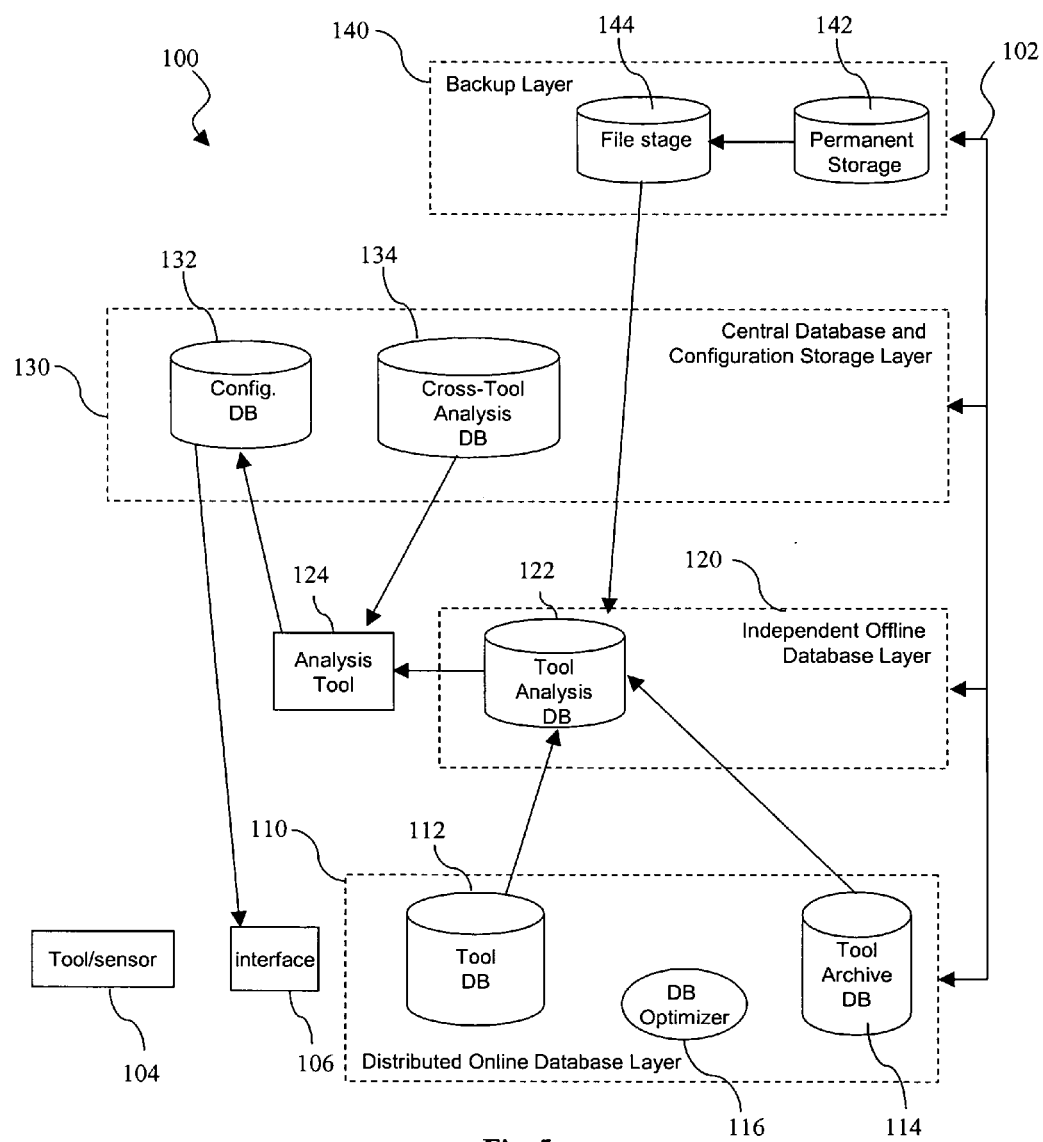
FIG. 5 illustrates an exemplary data flow corresponding to the method of FIG. 4.

Referring now to FIG. 4 and with additional reference to FIG. 5, an exemplary method 170 illustrates another possible flow of data through the system 100 of FIG. 1. In the present example, the data flow enables data to be retrieved from multiple databases and analyzed, with results from the analysis being used as feedback for controlling the process tool 104. The analysis may reveal a fault in the operation of the process tool 104. The fault may then be classified and remedial action may be taken to address the fault.

In step 172, data may be imported into the tool analysis database 122 from one or more of the tool database 112, the tool archive database 114, and the permanent storage 142.

In step 174, the data from the tool analysis database 122 and data from the cross-tool analysis database may be imported into the analysis tool 124. It is understood that data may be imported directly from one or more of the process tool 104, the interface 106, the tool database 112, the tool archive database 114, and the permanent storage 142.

In step 176, the imported data may be analyzed using the analysis tool 124. The analysis may identify faults (e.g., incorrect parameters such as pressure, temperature, process time, etc.), possible optimizations, or other results. For example, data from the tool analysis database 122 (storing data from the tool database 112) may be compared to data from the cross-tool analytic database 134 to identify operations where the performance of the process tool 104 is lower than that of other process tools. In some embodiments, if the performance is outside of a predefined range, a fault may exist.

In step 178, a determination may be made as to whether a fault was detected in step 176. Additionally or alternatively, optimizations may be identified to improve the operation of the process tool 104.

In step 180, if a fault was determined to exist in step 178, the fault may be classified and a remedy may be identified based at least partly on the classification. For example, the analysis may indicate that the fault stems from an incorrect pressure within a chamber of the process tool 104. The fault may then be classified as a pressure fault, and the possible remedies for pressure faults may be examined. If the pressure is too low, a remedy may be selected that will increase the pressure until a predefined pressure level is attained. If the fault is outside of certain parameters, an engineer may be notified to take corrective action or to further examine the problem.

In step 182, results from the analysis tool 124 may be used to update the configuration information in the configuration database 132. The results may be stored directly into the configuration database 132 or may be formatted prior to such storage. For example, software instructions may be used to select specific data from the results and save that data into predefined configuration fields that correspond to configuration information needed by the process tool. The configuration update may include instructions needed to implement the remedy identified in step 180 (e.g., increase the pressure).

In step 180, the updated configuration information may be transferred to the FDC interface 106 for use in controlling the process tool 104.

Figure 6:
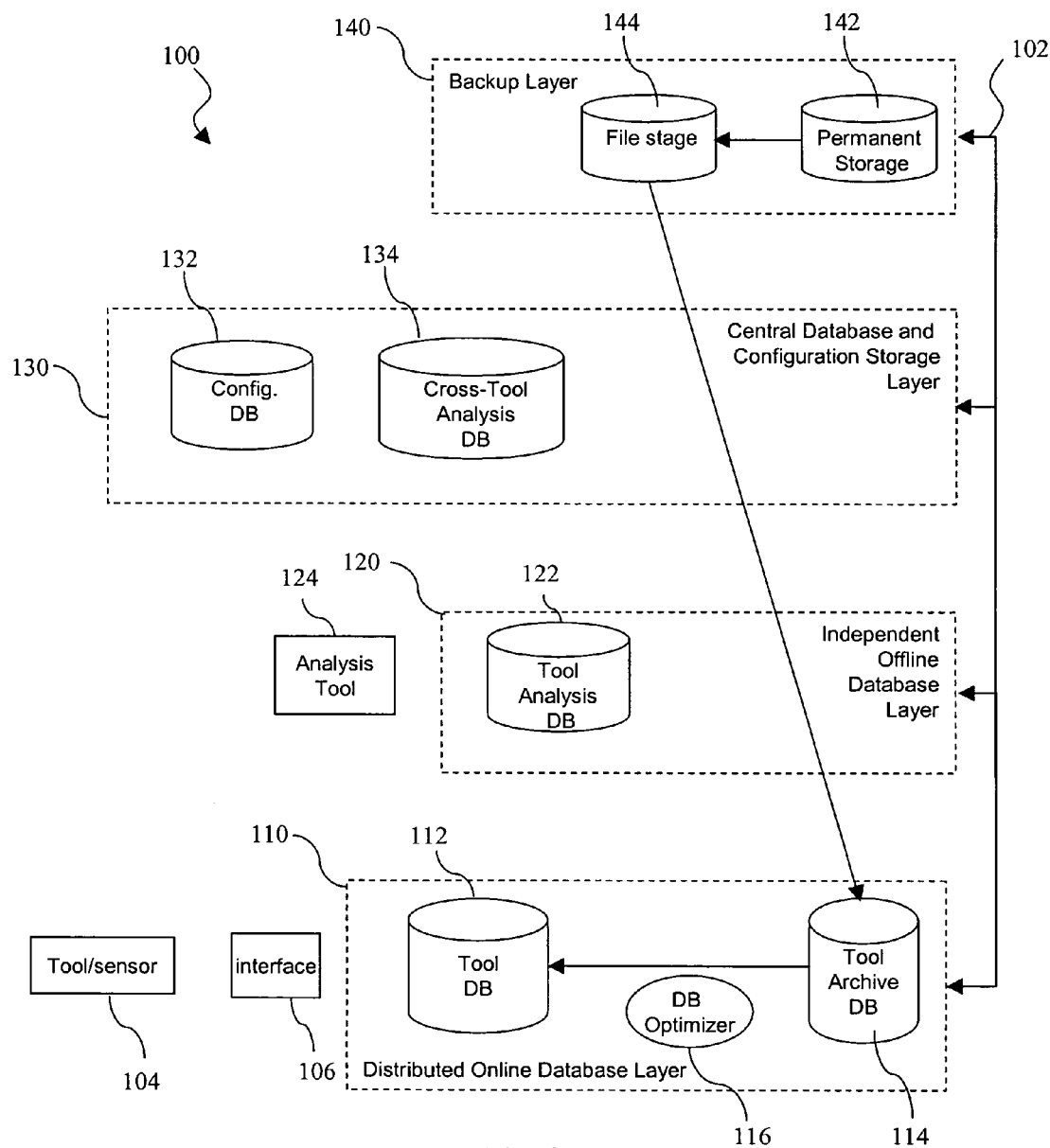
FIG. 6 illustrates an exemplary data flow for restoring archived data within the system of FIG. 1.

Referring now to FIG. 6, an exemplary data flow within the system 100 of FIG. 1 illustrates the retrieval of archived data from permanent storage. This may be needed, for example, if a system failure has deleted or corrupted system information stored in one or more of the databases 112, 114, 122, 132, 134.

The archived data may first be retrieved from permanent storage 142 and sent through the file stage 144. The file stage 144 may decompress data, restore data to a predefined format, organize data in files, and perform similar operations. It is understood that the file stage 144 may reverse these operations for files being stored to the permanent storage 142. From the file stage 144, the data may be transferred to the tool archive database 114. The data may then be restored to the tool database 112.

Figure 7:
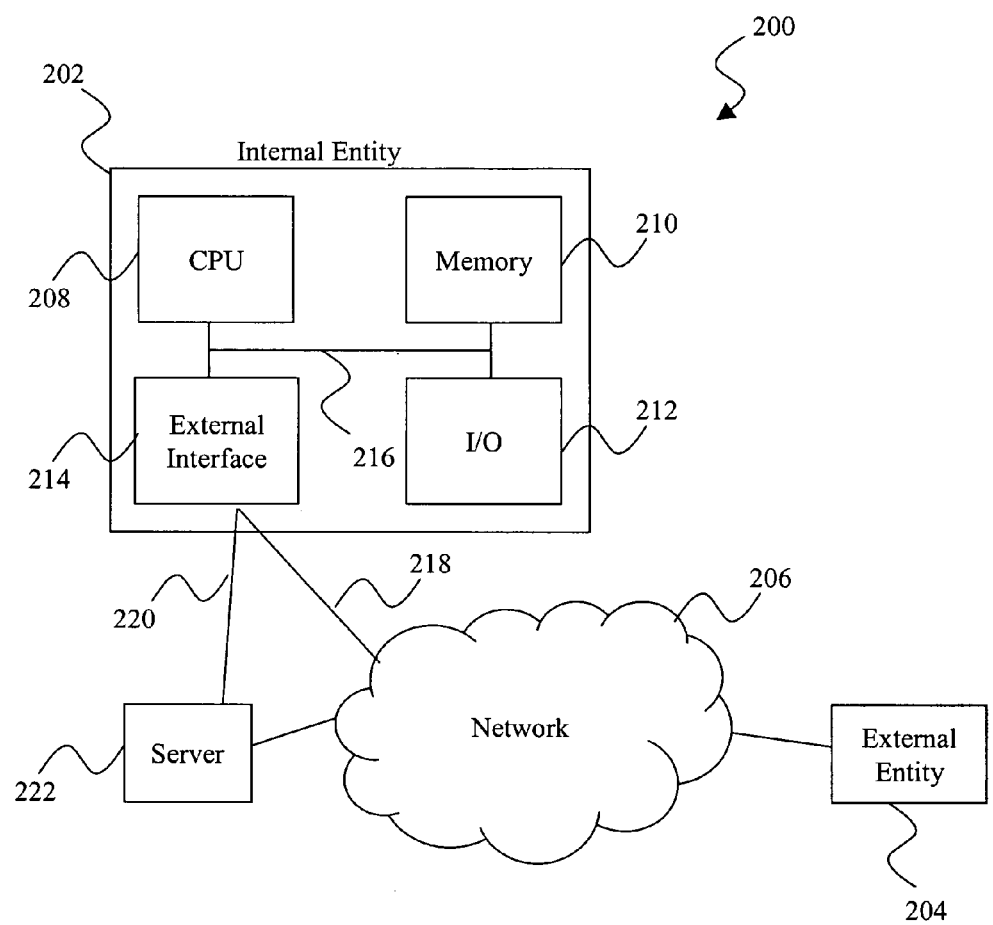
FIG. 7 illustrates an exemplary virtual fabrication system within which the system of FIG. 1 may be implemented.

Referring now to FIG. 7, a virtual IC fabrication system (a "virtual fab") 200 provides an exemplary environment within which the system 100 of FIG. 1 may be implemented. For example, various components of the system 100 may be included in or represented by the entities of the virtual fab 200. The virtual fab 200 includes a plurality of entities represented by one or more internal entities 202, and one or more external entities 204 that are connected by a communications network 206 (e.g., the network 102 of FIG. 1). The network 206 may be a single network or may be a variety of different networks, such as an intranet and the Internet, and may include both wireline and wireless communication channels.

Each of the entities 202, 204 may include one or more computing devices such as personal computers, personal digital assistants, pagers, cellular telephones, and the like. For the sake of example, the internal entity 202 is expanded to show a central processing unit (CPU) 208, a memory unit 210, an input/output (I/O) device 212, and an external interface 214. The external interface may be, for example, a modem, a wireless transceiver, and/or one or more network interface cards (NICs). The components 208–214 are interconnected by a bus system 216. It is understood that the internal entity 202 may be differently configured and that each of the listed components may actually represent several different components. For example, the CPU 208 may actually represent a multi-processor or a distributed processing system; the memory unit 224 may include different levels of cache memory, main memory, hard disks, and remote storage locations; and the I/O device 212 may include monitors, keyboards, and the like.

The internal entity 202 may be connected to the communications network 206 through a wireless or wired link 218, and/or through an intermediate network 220, which may be further connected to the communications network. The intermediate network 220 may be, for example, a complete network or a subnet of a local area network, a company wide intranet, and/or the Internet. The internal entity 202 may be identified on one or both of the networks 206, 220 by an address or a combination of addresses, such as a MAC address associated with the network interface 214 and an IP address. Because the internal entity 202 may be connected to the intermediate network 220, certain components may, at times, be shared with other internal entities. Therefore, a wide range of flexibility is anticipated in the configuration of the internal entity 202. Furthermore, it is understood that, in some implementations, a server 222 may be provided to support multiple internal entities 202. In other implementations, a combination of one or more servers and computers may together represent a single entity.

In the present example, the internal entities 202 represents those entities that are directly responsible for producing the end product, such as a wafer or individually tested IC devices. Examples of internal entities 202 include an engineer, customer service personnel, an automated system process, a design or fabrication facility and fab-related facilities such as raw-materials, shipping, assembly or test. Examples of external entities 204 include a customer, a design provider, and other facilities that are not directly associated or under the control of the fab.

In addition, additional fabs and/or virtual fabs can be included with the internal or external entities. Each entity may interact with other entities and may provide services to and/or receive services from the other entities.

It is understood that the entities 202, 204 may be concentrated at a single location or may be distributed, and that some entities may be incorporated into other entities. In addition, each entity 202, 204 may be associated with system identification information that allows access to information within the system to be controlled based upon authority levels associated with each entities identification information.

The virtual fab 200 enables interaction among the entities 202, 204 for purposes related to IC manufacturing, as well as the provision of services. In the present example, IC manufacturing can include one or more of the following steps:

receiving or modifying a customer's IC order of price, delivery, and/or quantity;
receiving or modifying an IC design;
receiving or modifying a process flow;
receiving or modifying a circuit design;
receiving or modifying a mask change;
receiving or modifying testing parameters;
receiving or modifying assembly parameters; and
receiving or modifying shipping of the ICs.

One or more of the services provided by the virtual fab 200 may enable collaboration and information access in such areas as design, engineering, and logistics. For example, in the design area, the customer 204 may be given access to information and tools related to the design of their product via the fab 202. The tools may enable the customer 204 to perform yield enhancement analyses, view layout information, and obtain similar information. In the engineering area, the engineer 202 may collaborate with other engineers 202 using fabrication information regarding pilot yield runs, risk analysis, quality, and reliability. The logistics area may provide the customer 204 with fabrication status, testing results, order handling, and shipping dates. It is understood that these areas are exemplary, and that more or less information may be made available via the virtual fab 200 as desired.

Another service provided by the virtual fab 200 may integrate systems between facilities, such as between a facility 204 and the fab facility 202. Such integration enables facilities to coordinate their activities. For example, integrating the design facility 204 and the fab facility 202 may enable design information to be incorporated more efficiently into the fabrication process, and may enable data from the fabrication process to be returned to the design facility 204 for evaluation and incorporation into later versions of an IC.

In the present example, multiple internal entities 202 may represent the process tool 104, interface 106, various databases, and other components of the system 100 of FIG. 1. Using the network 102 (which may form some or all of the network 206), an external entity (e.g., a customer or an offsite engineer) may access the system 100 to restore data and perform other functions. It is understood that various components of the system 100 may be distributed throughout the virtual fab 200.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. For example, various steps in the above described methods may be combined, further divided, or eliminated entirely. Furthermore, steps may be performed in any order, and steps described with respect to different methods may be combined into a single method. In addition, data flows other than those illustrated may be used to provide identical or similar functionally. Accordingly, it is appropriate that the appended claims be construed broadly and in a manner consistent with the scope of the disclosure.

What is claimed is:

1. A computer-executable method for detecting a fault and identifying a remedy for the fault in real-time in a semiconductor product manufacturing facility, the system comprising:

importing data from a manufacturing device into an analysis tool;
importing data representing a plurality of different manufacturing devices into the analysis tool;
analyzing the imported data to determine if a fault exists in the manufacturing device's operation;

if a fault exists, classifying the fault and identifying a remedy for the fault based at least partly on the classification;

updating configuration data used to control the manufacturing device, wherein the updating applies the remedy to the configuration information; and modifying the manufacturing device's operation using the updated configuration data.

2. The computer-executable method of claim 1 further comprising storing the data from the manufacturing device in a tool database prior to importing the data into the analysis tool, wherein the data is imported into the analysis tool from the tool database.

3. The computer-executable method of claim 2 further comprising importing the data from the tool database into an analysis database associated with the analysis tool prior to importing the data into the analysis tool, wherein the data is imported into the analysis tool from the analysis database.

4. The computer-executable method of claim 3 further comprising importing archive data into the analysis database from at least one of a tool archive database configured to archive data from the tool database, and a permanent storage.

5. The computer-executable method of claim 2 wherein the data representing a plurality of different manufacturing devices is imported into the analysis tool from a cross-tool analysis database containing comparison data from the plurality of different manufacturing devices.

6. The computer-executable method of claim 5 wherein updating configuration data used to control the manufacturing device includes storing the configuration information in a configuration database accessible to an interface for the manufacturing device, and wherein modifying the manufacturing device's operation includes transferring the configuration information from the configuration database to the interface.

7. The computer-executable method of claim 1 further comprising:

storing data from the manufacturing device into a tool database;

optimizing the data in the tool database;

transferring the data from the tool database to a cross-tool analysis database; and analyzing the data from the cross-tool analysis database by comparing the data with data from a plurality of other manufacturing devices.

8. The computer-executable method of claim 7 wherein analyzing the data from the cross-tool analysis database identifies a trend in the manufacturing device's operation.

9. The computer-executable method of claim 7 wherein analyzing the data from the cross-tool analysis database identifies an optimization to be made in the manufacturing device's operation.

10. The computer-executable method of claim 7 wherein optimizing the data includes identifying and discarding fragmented data, and compressing non-fragmented data.

11. The computer-executable method of claim 1 further comprising instructions for producing a report summarizing the analyzed data.

12. A system for real-time fault detection and classification in a semiconductor product manufacturing facility, the system comprising:

a tool database configured to store data from a manufacturing device;

a tool analysis database accessible to the tool database and configured to store data for analysis by an analysis tool;

a cross-tool analysis database accessible to the tool analysis database and configured to store data comparing a plurality of manufacturing devices;

a configuration database accessible to the analysis tool and configured to store data used for controlling the manufacturing device; and a plurality of software instructions for execution within the system, the instructions including:

instructions for importing data from the tool database into the tool analysis database;

instructions for importing data from the tool analysis database and the cross-tool analysis database into the analysis tool;

instructions for analyzing the imported data to determine if a fault exists in the manufacturing device's operation;

instructions for, if a fault exists, classifying the fault and identifying a remedy for the fault based at least partly on the classification;

instructions for updating the data in the configuration database using the remedy; and instructions for modifying the manufacturing device's operation using the updated data from the configuration database.

13. The system of claim 12 further comprising an interface accessible to the manufacturing device and the configuration database, wherein the instructions for modifying the manufacturing device's operation using the updated data from the configuration database include transferring the data from the configuration database to the interface.

14. The system of claim 12 further comprising a tool archive database accessible to the tool database and configured to archive data from the tool database.

15. The system of claim 14 further comprising instructions for a database optimization process, the instructions including:

instructions for storing data from the manufacturing device in the tool database;

instructions for optimizing the data stored in the tool database; and instructions for archiving the data in the tool database by storing the data in the archive database.

16. The system of claim 15 wherein the instructions for archiving the data in the tool database include instructions for compressing the data.

17. The system of claim 15 wherein the instructions for optimizing the data include instructions for filtering fragmented data from the tool database.

18. The system of claim 12 further comprising archiving files from the tool archive database to a permanent storage medium.

19. The system of claim 18 further comprising instructions for restoring data from the permanent storage medium to the tool archive database, and from the tool archive database to the tool database.

20. The system of claim 12 further comprising:

instructions for transferring the data from the tool database to the cross-tool analysis database; and instructions for analyzing the data by comparing the data to similar data obtained from a plurality of other manufacturing devices.

* * * * *